United States Patent
Stokes et al.

(10) Patent No.: US 8,291,338 B2
(45) Date of Patent: Oct. 16, 2012

(54) METHOD OF DISPLAYING AND EDITING PROPERTIES OF ARTIFACTS IN GRAPHICAL EDITORS

(75) Inventors: Michael T. Stokes, Raleigh, NC (US); David Kirk Grotjohn, Cary, NC (US); Lucinio Santos, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1228 days.

(21) Appl. No.: 11/533,572

(22) Filed: Sep. 20, 2006

(65) Prior Publication Data

US 2008/0086701 A1    Apr. 10, 2008

(51) Int. Cl.
*G06F 3/048* (2006.01)
(52) U.S. Cl. ........................................ 715/777; 715/808
(58) Field of Classification Search .................. 715/808, 715/777

See application file for complete search history.

(56) References Cited

U.S. PATENT DOCUMENTS

| | | | |
|---|---|---|---|
| 5,742,768 A | 4/1998 | Gennaro et al. | |
| 5,850,548 A * | 12/1998 | Williams | 717/107 |
| 6,044,218 A | 3/2000 | Faustini | |
| 6,185,591 B1 | 2/2001 | Baker et al. | |
| 6,330,005 B1 * | 12/2001 | Tonelli et al. | 715/735 |
| 6,826,729 B1 | 11/2004 | Giesen et al. | |
| 2003/0160830 A1 | 8/2003 | DeGross | |
| 2004/0139391 A1 | 7/2004 | Stumbo et al. | |
| 2005/0234840 A1 * | 10/2005 | Bechtold et al. | 706/46 |
| 2006/0212362 A1 * | 9/2006 | Donsbach et al. | 705/26 |

* cited by examiner

*Primary Examiner* — Ba Huynh
(74) *Attorney, Agent, or Firm* — Hamilton & Terrile, LLP; Gary W. Hamilton

(57) ABSTRACT

A method, apparatus and computer-usable medium for improved management of object properties in an integrated development environment (IDE). A cursor mode allows the underlying properties of one or more predetermined objects in a graphical editor to be dynamically viewed and modified by a user. One or more object's properties are displayed in an object properties pop-up viewer/editor window adjacent to the cursor when a user "mouses-over" target objects in a graphical editor and are editable upon explicit user gesture. The properties pop-up viewer/editor window is implementable to move with the cursor, i.e., cursor-attached, and to remain open to dynamically display, without additional user gestures, the respective properties of each predetermined object a user mouses-over.

20 Claims, 6 Drawing Sheets

METHOD OF DISPLAYING AND EDITING PROPERTIES OF ARTIFACTS IN GRAPHICAL EDITORS

BACKGROUND OF THE INVENTION

The present invention relates in general to the field of computers and other data processing systems including hardware, software, and processes. More particularly, it relates to the interactive viewing and modification of object properties in a graphical integrated development environment (IDE).

Integrated development environments (IDEs) have grown in popularity with software developers in recent years. Current IDEs include functionalities for authoring, editing, compiling and debugging software, generally through the implementation of a graphical interface that conveys the appearance of all development being performed within a single application. The graphical interface typically comprises separate windows or panes for the display of software objects and their properties and includes an editor that allows users to control artifacts through direct manipulation of their visual representations. An artifact within the graphical editor is typically selected through a user gesture and, once selected, a separate dialog window or pane is opened to read, write, or modify its properties. The resulting, disjointed display is inefficient as it requires the user to visually switch between the editor view and the properties dialog/view of each object they wish to inspect or modify. In some cases, the object's properties view may be minimized or closed, requiring additional user gestures to manually access, view and modify its contents.

It is not always desirable for the editor window and the properties dialog/view window to be open at the same time. If the editor window is maximized to provide the greatest amount of work area, the user will often need to minimize or exit the editor window and then access and open the properties dialog/view window to display a selected object's properties. Once the viewing or editing of object properties is completed, the user reverses the process to return to the graphical editor. This sequence of processes can be awkward, error-prone and time consuming. Conversely, if the properties dialog/view window is kept open, it either reduces the total work area available for use by the graphical editor (e.g., in the case of a docked properties view) or it obscures a portion of the graphical editor's work area (e.g., in the case of a floating dialog window).

Previous approaches include property dialog or inspector windows that float above a graphical editor work space. These property dialog/views can be displayed on-demand and generally do not consume as much workspace as static windows or panes. However, they typically open in their last-used location, requiring the user to maintain their positional orientation between the property dialog/view and the selected object. Furthermore, the user is still required to visually switch between the selected object and the property dialog/view.

Other existing approaches include pop-up windows that display embedded information regarding an object. However, pop-up windows in these approaches are not implemented to display the properties of a selected object in a graphical editor, nor do they display the properties of multiple objects. Furthermore, they do not move with the cursor (i.e., cursor-attached), their content does not change dynamically when the cursor hovers over an object, nor is their content editable upon explicit gesture. In view of the foregoing, there is a need for improved management of an object's properties in a graphical IDE.

SUMMARY OF THE INVENTION

The present invention provides a method, apparatus and computer-usable medium for improved management of object properties in an integrated development environment (IDE). In the present invention, a cursor mode is implemented to allow the underlying properties of one or more predetermined objects in a graphical editor to be dynamically viewed and modified by a user. In various embodiments of the invention, when a user "mouses-over" a target object in a graphical editor, the object's properties are displayed in an object properties pop-up (prop-pop-up) viewer/editor window next to the cursor. In these embodiments, the user is not required to visually switch between the editor view of an object and a separate dialog window or pane. Therefore, the field of view remains within the editor and the vicinity of the object's visual representation.

In an embodiment of the invention, a prop-pop-up window is implemented to open adjacent to the position of the cursor. In another embodiment of the invention, a single prop-pop-up window is implemented to display property information for two or more predetermined objects in a graphical editor, thereby removing the need to open two or more prop-pop-up windows and switch between them to compare the properties of their respective objects. In yet another embodiment of the invention, a prop-pop-up window is implemented to move with the cursor (i.e., cursor-attached) and remain open to dynamically display, without additional user gestures, the respective properties of each predetermined object a user mouses-over in a graphical editor. In this embodiment of the invention, browsing of object properties is faster as users can view an object's properties by simple mouse-over events instead of executing a user gesture for each object to be examined.

In yet another embodiment of the invention, object properties displayed in the prop-pop-up window are visually adjacent to the object's location in the graphical editor and are editable upon explicit user gesture. In this embodiment of the invention, response time to view object properties is optimized as properties are displayed without their editing widgets. Widgets needed to edit object properties (e.g., dropdown boxes, text areas, etc.) are loaded with an explicit user gesture (e.g., clicking on the properties area). Furthermore, fewer mouse movements are required to edit object properties, since the prop-pop-up window is close to the mouse. The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
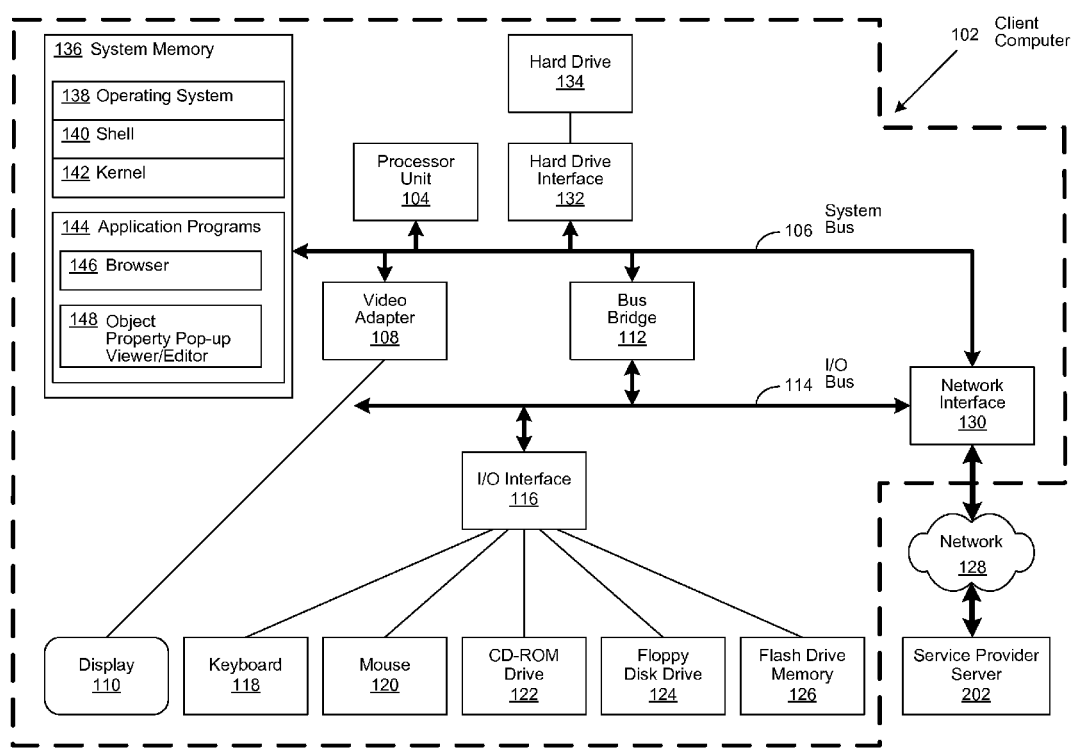
FIG. 1 illustrates an exemplary client computer in which the present invention may be implemented.

A method, apparatus and computer-usable medium are disclosed for improved management of object properties in an integrated development environment (IDE). In various embodiments of the invention, a cursor mode is implemented that allows the underlying properties of one or more predetermined objects in a graphical editor to be dynamically viewed and modified by a user.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, or store the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 150 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 150.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes client computer 102's operating system (OS) 138 and application programs 144.

OS 138 includes a shell 140 for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and application programs 144, including memory management, process and task management, disk management, and mouse and keyboard management.

Application programs 144 may include a browser 146. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 150.

Application programs 144 in client computer 102's system memory also include a policy validator 148. Policy validator 148 includes code for implementing the processes described in FIGS. 2-5 described hereinbelow. In one embodiment, client computer 102 is able to download policy validator 148 from a service provider server 150.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
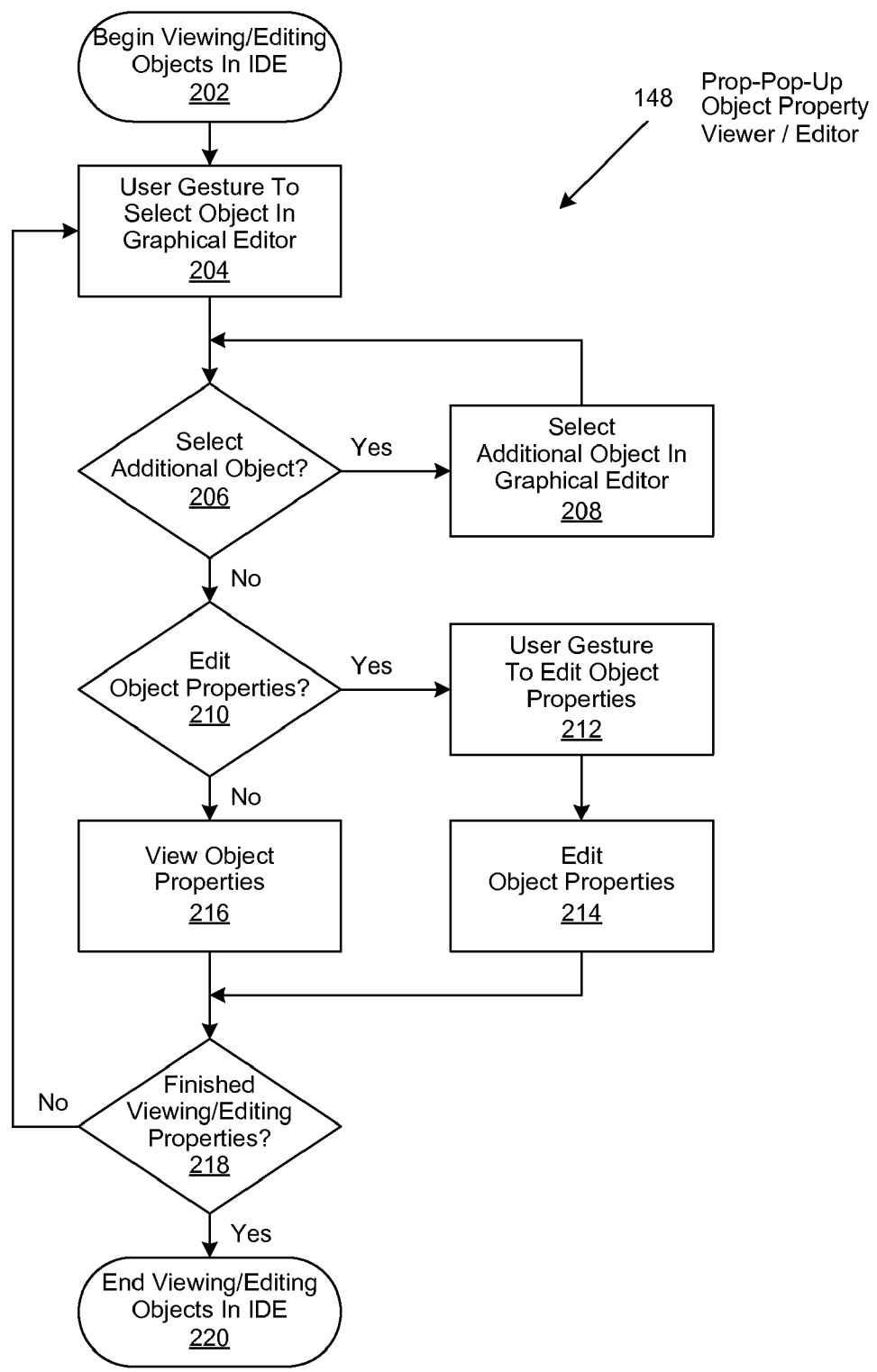
FIG. 2 is a generalized flowchart of an implementation of object property pop-up viewer/editor (prop-pop-up) as used in accordance with an embodiment of the invention for the viewing and editing of the properties of a predetermined object depicted in a graphical editor comprising an integrated development environment (IDE)

FIG. 2 is a generalized flowchart of an implementation of object property pop-up viewer/editor (prop-pop-up) 148 as used in accordance with an embodiment of the invention for the viewing and editing of the properties of a predetermined object depicted in a graphical editor comprising an integrated development environment (IDE). In step 202, the user begins object property viewing and editing operations within a graphical editor comprising an IDE. In step 204, a first object is selected within the graphical editor through a first mouse-over user gesture (e.g., right-mouse-click) to view its properties. In an embodiment of the invention, prop-pop-up viewer/editor 148 is implemented to open adjacent to the position of the cursor as a user mouses-over an object depicted in a graphical editor to display its properties. In another embodiment of the invention, prop-pop-up viewer/editor 148 is implemented to move with the cursor (i.e., cursor-attached) and remain open to dynamically display the respective properties of each depicted object a user mouses-over in a graphical editor.

If the user decides to select a second object to compare its properties to the first selected object in step 206, it is selected in step 208 through a second mouse-over user gesture (e.g., ctrl-right-mouse-click). Step 206 and step 208 are then iteratively repeated to select additional objects to compare their respective properties. In one embodiment of the invention, prop-pop-up viewer/editor 148 is implemented to display the respective properties of two or more predetermined objects depicted in a graphical editor, thereby removing the need to open two or more prop-pop-up windows and switch between them to compare the properties of their respective objects.

If the user decides in step 210 to view, but not edit, the respective properties of predetermined objects that have been selected in a graphical editor, then the respective object properties are viewed in step 216 as described in greater detail hereinabove. In an embodiment of the invention, response time to view object properties (i.e., read-only) in the prop-pop-up window is optimized as properties are displayed without their editing widgets. If, in step 218, the user decides to view or edit the properties of other or additional objects depicted in a graphical editor, the process is repeated beginning with step 204. Otherwise, object property viewing and editing operations within a graphical editor comprising an IDE is ended in step 220. If the user decides in step 210 to edit the respective properties of predetermined objects that have been selected in a graphical editor, then a predetermined mouse-over user gesture (e.g., double-right-mouse-click) alters the behavior of prop-pop-up viewer/editor 148 to allow the user to edit object properties in step 214 as described in greater detail hereinabove. In one embodiment of the invention, object properties displayed in the prop-pop-up window are visually adjacent to the object's location in the graphical editor and editable upon explicit user gesture. Widgets needed to edit object properties (e.g., dropdown boxes, text areas, etc.) are loaded with an explicit user gesture (e.g., double-right-mouse-click). Furthermore, fewer mouse movements are required to edit object properties, since the prop-pop-up window is close to the cursor. If, in step 218, the user decides to view or edit the properties of other or additional objects depicted in a graphical editor, the process is repeated beginning with step 204. Otherwise, object property viewing and editing operations within a graphical editor comprising an IDE is ended in step 220.

Figure 3:
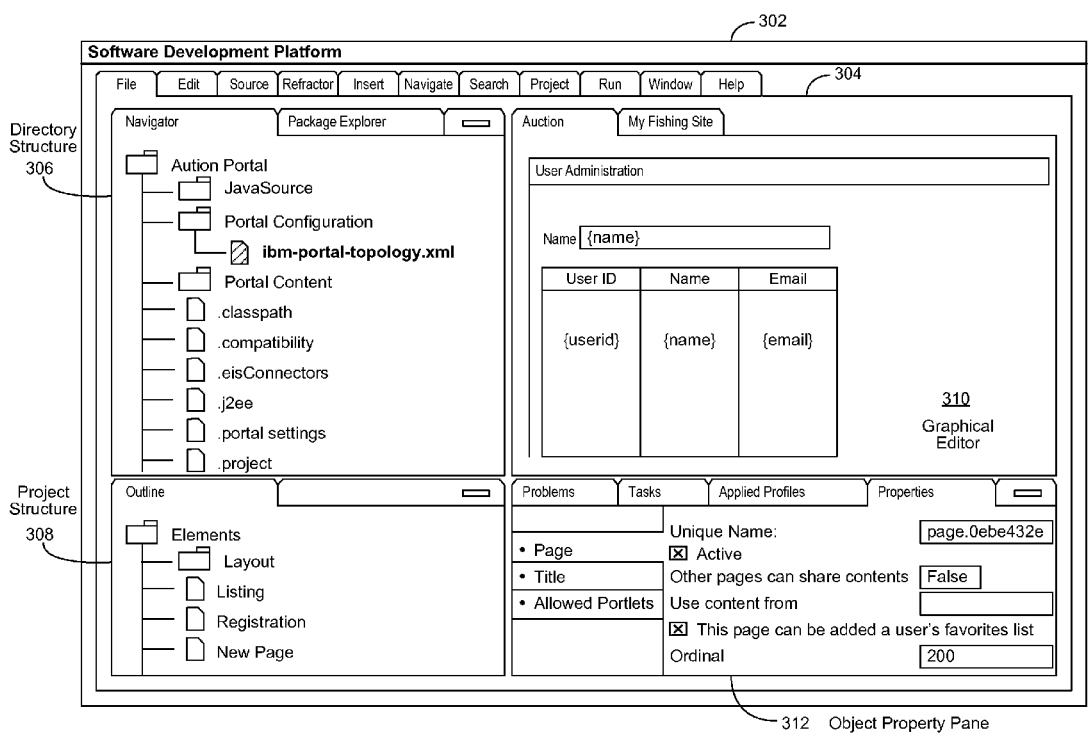
FIG. 3 is a generalized illustration of an IDE as implemented with a graphical editor and a prior art object properties viewer/editor.

FIG. 3 is a generalized illustration of an integrated development environment (IDE) as implemented with a graphical editor and a prior art object properties viewer/editor. In this illustration, graphical user interface (GUI) 302 comprises IDE 304, which comprises graphical directory structure 306, graphical project structure 308, graphical editor 310 and prior art object properties viewer/editor 312. Graphical directory structure 406 and graphical project structure 308 are used for navigation between various components comprising IDE 304. Graphical editor 310 allows users to control artifacts through direct manipulation of their visual representations. As typically implemented, an artifact within the graphical editor is selected through a user gesture, and once selected, prior art object properties viewer/editor 312 is opened to read, write, or modify its properties. It will be apparent to those of skill in the art that the resulting, disjointed display is inefficient as it requires the user to visually switch between the editor view and the properties dialog/view of each object they wish to inspect or modify. Furthermore, as described in greater detail hereinabove, it is not always desirable for the editor window and the properties dialog/view window to be open at the same time as the total work area available for use by the graphical editor is reduced.

Figure 4A:
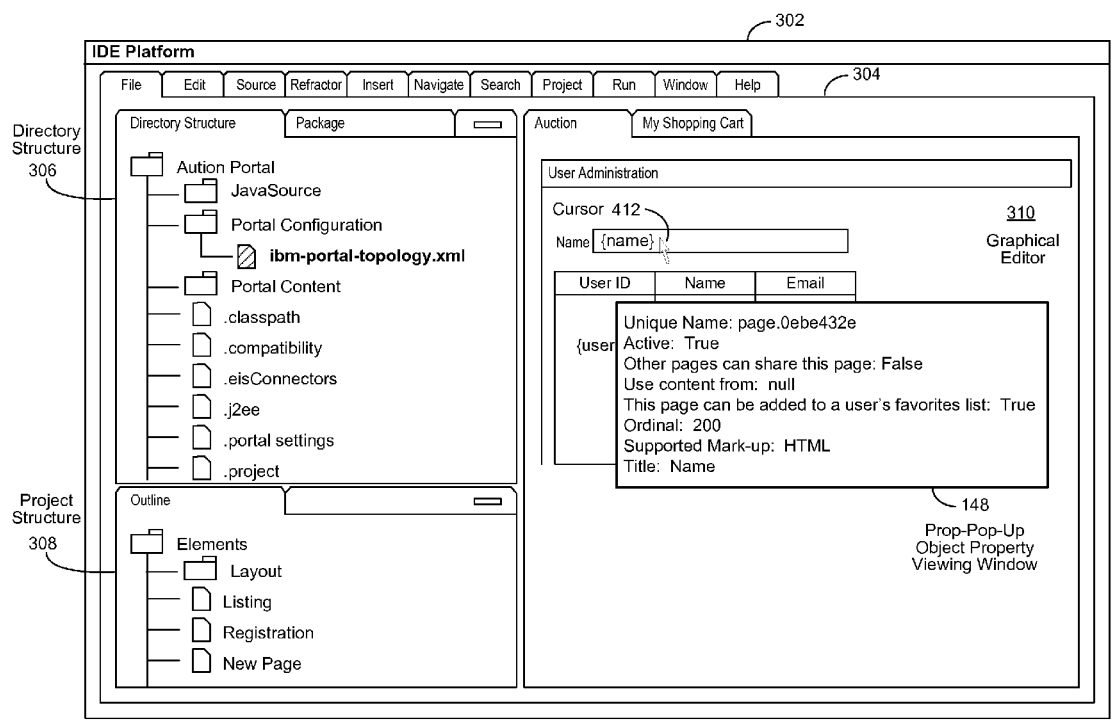
FIGS. 4a-b are generalized illustrations of object prop-pop-up viewer/editor as implemented in accordance with an embodiment of the invention for the viewing of object properties in an IDE.
Figure 4B:
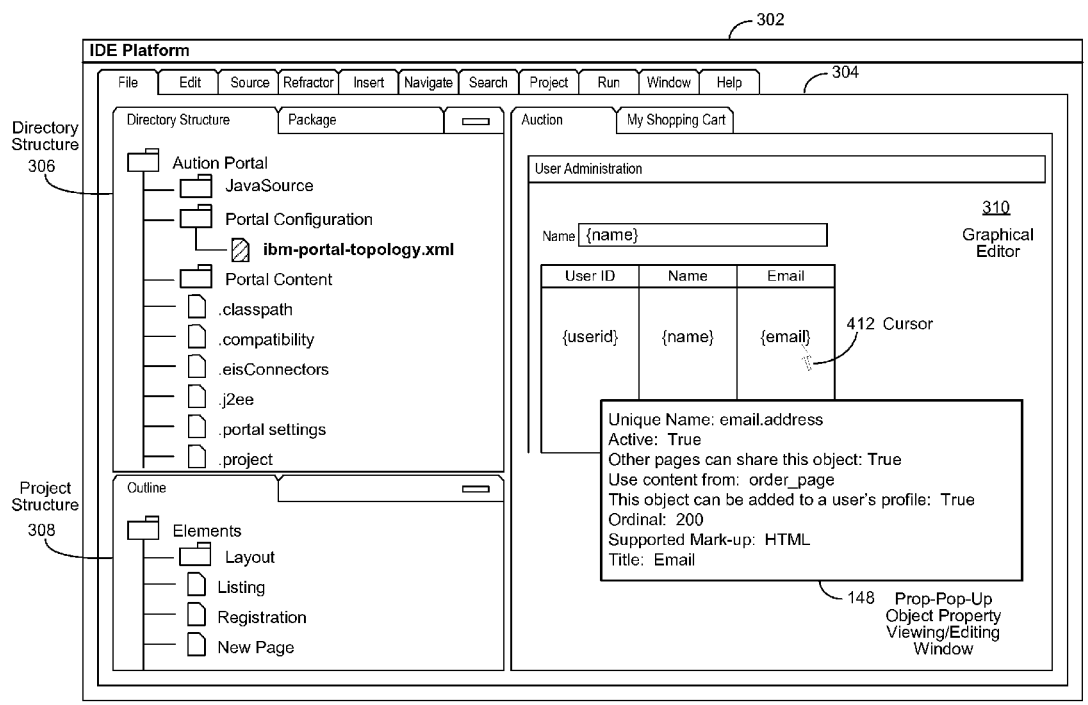

FIGS. 4a-b are generalized illustrations of object property pop-up viewer/editor (prop-pop-up) 148 as implemented in accordance with an embodiment of the invention for the viewing of object properties in an IDE. In these illustrations, graphical user interface (GUI) 302 comprises IDE 304, which comprises graphical directory structure 306, graphical project structure 308, graphical editor 310, cursor 412, and object prop-pop-up viewer/editor 148. Graphical directory structure 306 and graphical project structure 308 are used for navigation between various components comprising IDE 304. Graphical editor 310 allows users to control artifacts through direct manipulation of their visual representations. In FIG. 4a, prop-pop-up viewer/editor 148 is implemented to open adjacent to the position of the cursor 412 as a user mouses-over an object depicted in graphical editor 310 to display its properties. In FIG. 4b, prop-pop-up viewer/editor 148 is implemented to move with the cursor 412 (i.e., cursor-attached) and remain open to dynamically display the respective properties of each depicted object a user mouses-over in graphical editor 310. In another embodiment of the invention, response time to view object properties (i.e., read-only) in prop-pop-up viewer/editor 148 is optimized as properties are displayed without their editing widgets.

Figure 5:
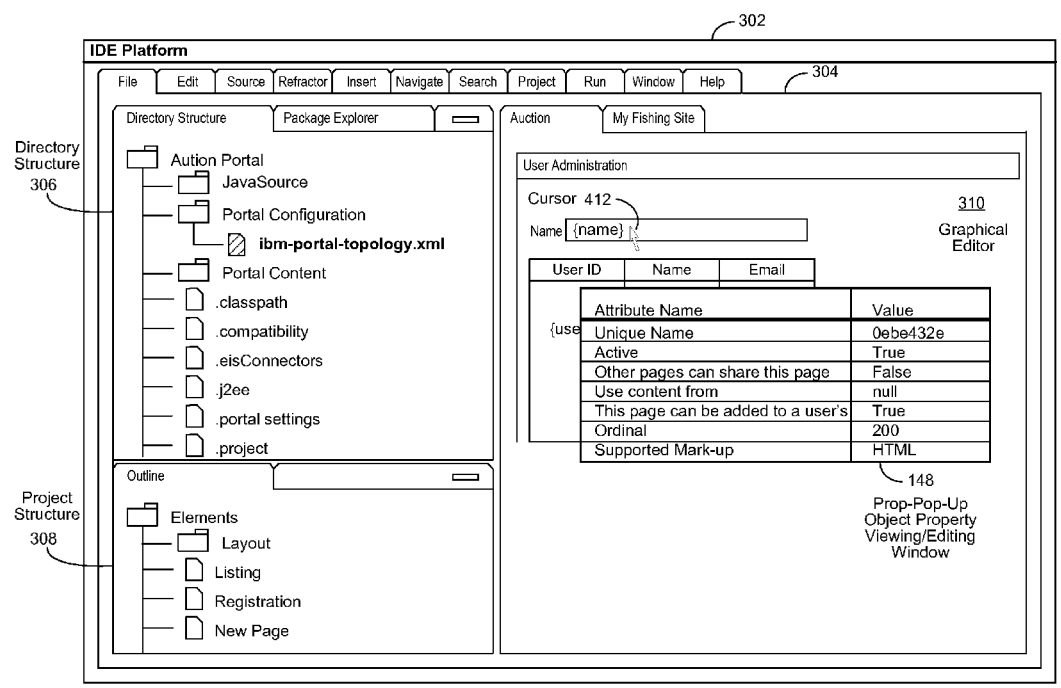
FIG. 5 is a generalized illustration of object prop-pop-up viewer/editor as implemented in accordance with an embodiment of the invention for the editing of object properties in an IDE.

FIG. 5 is a generalized illustration of object prop-pop-up viewer/editor as implemented in accordance with an embodiment of the invention for the editing of object properties in an IDE. In this illustration, graphical user interface (GUI) 302 comprises IDE 304, which comprises graphical directory structure 306, graphical project structure 308, graphical editor 310, cursor 412, and object prop-pop-up viewer/editor 148. Graphical directory structure 306 and graphical project structure 308 are used for navigation between various components comprising IDE 304. Graphical editor 310 allows users to control artifacts through direct manipulation of their visual representations. In one embodiment of the invention, prop-pop-up viewer/editor 148 is implemented to open adjacent to the position of the cursor 412 as a user mouses-over an object depicted in graphical editor 310 to view its properties in an edit mode. In another embodiment of the invention, prop-pop-up viewer/editor 148 is implemented to move with the cursor 412 (i.e., cursor-attached) and remain open to dynamically display the respective properties of each depicted object a user mouses-over in graphical editor 310 such that they can be edited.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

What is claimed is:

1. A computer-implementable method for viewing properties of objects, comprising processing logic used for:
   receiving user input data to select a first object and a second object within a graphical user interface (GUI) of an integrated development environment (IDE), wherein processing of said user input data places a cursor in a position proximate to said first object;
   generating a pop-up window adjacent to said cursor position, wherein said pop-up window is associated with the position of said cursor within said GUI;
   determining a first set of properties associated with said first object and a second set of properties associated with said second object; and
   displaying said first set of properties and said second set of properties in said pop-up window;
   wherein said first set of properties and said second set of properties are concurrently displayed in said pop-up window as said cursor is moved between said first and second objects.

2. The method of claim 1, wherein a graphical editor is used to edit said first set of properties and said second set of properties within said pop-up window.

3. The method of claim 2, wherein said editing modifies said first set of properties and said second set of properties.

4. The method of claim 3, wherein said first set of properties and said second set of properties are dynamically displayed when said cursor is placed proximate to said first and second objects.

5. The method of claim 4, wherein said pop-up window initially operates in a read-only mode.

6. The method of claim 5, wherein said operational functionality of said pop-up window is modified by user gestures within said GUI.

7. The method of claim 6, wherein said modifying of said operational functionality displays a plurality of widgets in a plurality of drop-down menus in said pop-up windows.

8. A system comprising:
   a processor;
   a data bus coupled to the processor; and
   a computer-usable medium embodying computer program code, the computer-usable medium being coupled to the data bus, the computer program code comprising instructions executable by the processor and configured for:
      receiving user input data to select a first object and a second object within a graphical user interface (GUI) of an integrated development environment (IDE), wherein processing of said user input data places a cursor in a position proximate to said first object;
      generating a pop-up window adjacent to said cursor position, wherein said pop-up window is associated with the position of said cursor within said GUI;
      determining a first set of properties associated with said first object and a second set of properties associated with said second object; and
      displaying said first set of properties and said second set of properties in said pop-up window;
      wherein said first set of properties and said second set of properties are concurrently displayed in said pop-up window as said cursor is moved between said first and second objects.

9. The system of claim 8, wherein a graphical editor is used to edit said first set of properties and said second set of properties within said pop-up window.

10. The system of claim 9, wherein said editing modifies said first set of properties and said second set of properties.

11. The system of claim 10, wherein said first set of properties and said second set of properties are dynamically displayed when said cursor is placed proximate to said first and second objects.

12. The system of claim 11, wherein said pop-up window initially operates in a read-only mode.

13. The system of claim 12, wherein said operational functionality of said pop-up window is modified by user gestures within said GUI.

14. The system of claim 13, wherein said modifying of said operational functionality displays a plurality of widgets in a plurality of drop-down menus in said pop-up windows.

15. A non-transitory computer-usable medium embodying computer program code, the computer program code comprising computer executable instructions configured for:
   receiving user input data to select a first object and a second object within a graphical user interface (GUI) of an integrated development environment (IDE), wherein processing of said user input data places a cursor in a position proximate to said first object;
   generating a pop-up window adjacent to said cursor position, wherein said pop-up window is associated with the position of said cursor within said GUI;

determining a first set of properties associated with said first object and a second set of properties associated with said second object; and displaying said first set of properties and said second set of properties in said pop-up window;

wherein said first set of properties and said second set of properties are concurrently displayed in said pop-up window as said cursor is moved between said first and second objects.

16. The computer-usable medium of claim 15, wherein a graphical editor is used to edit said first set of properties and said second set of properties within said pop-up window.

17. The computer-usable medium of claim 16, wherein said editing modifies said first set of properties and said second set of properties.

18. The computer-usable medium of claim 17, wherein said first set of properties and said second set of properties are dynamically displayed when said cursor is placed proximate to said first and second objects.

19. The computer-usable medium of claim 18, wherein operational functionality of said pop-up window is modified by user gestures in said GUI.

20. The computer-usable medium of claim 19, wherein said modifying of said operational functionality displays a plurality of widgets in a plurality of drop-down menus in said pop-up window.

* * * * *